(12) United States Patent
Poudrier

(10) Patent No.: US 7,338,106 B2
(45) Date of Patent: Mar. 4, 2008

(54) SOUND DAMPING AND SEALING SYSTEM FOR TAIL GATE

(75) Inventor: Dany Poudrier, Laval (CA)

(73) Assignee: Michel Gohier Ltée., Laval, Québec (CA)

( * ) Notice: Subject to any disclaimer, the term of this patent is extended or adjusted under 35 U.S.C. 154(b) by 0 days.

(21) Appl. No.: 11/523,644

(22) Filed: Sep. 20, 2006

(65) Prior Publication Data
US 2007/0063526 A1 Mar. 22, 2007

(30) Foreign Application Priority Data
Sep. 22, 2005 (CA) .................................. 2520601

(51) Int. Cl.
*B62D 137/00* (2006.01)
(52) U.S. Cl. ........................ 296/50; 49/472; 277/345
(58) Field of Classification Search ................ 296/50, 296/146.8; 49/383, 472; 181/284; 277/345, 277/358, 361, 590, 628, 637, 650, 921
See application file for complete search history.

(56) References Cited

U.S. PATENT DOCUMENTS

| 4,699,428 | A | * | 10/1987 | Vick | ........................ 296/183.2 |
| 4,923,074 | A | * | 5/1990 | Johnston | ..................... 220/1.5 |
| 2005/0199440 | A1 | * | 9/2005 | Keefe et al. | ................ 181/284 |
| 2006/0006686 | A1 | * | 1/2006 | Schmeichel | .................. 296/50 |

* cited by examiner

*Primary Examiner*—Lori L. Lyjak
(74) *Attorney, Agent, or Firm*—Ogilvy Renault LLP

(57) ABSTRACT

A sound damping system for a swinging tail gate of a dump truck is described. The system comprises a two-part seal formed by a compressible sound damping material and a rigid compressing projection. One part of the two-part seal is secured along opposed vertical edges of opposed side walls of an open-top-end box of the truck. The other part is secured on opposed sides of an inner wall of the tail gate and aligned for facial contact with the first part. The tail gate is hingedly secured at a top end thereof to the opposed side walls of the box. The sound damping system also provides a more efficient sealing system between the gate when in a closed position with the box of the truck.

9 Claims, 3 Drawing Sheets

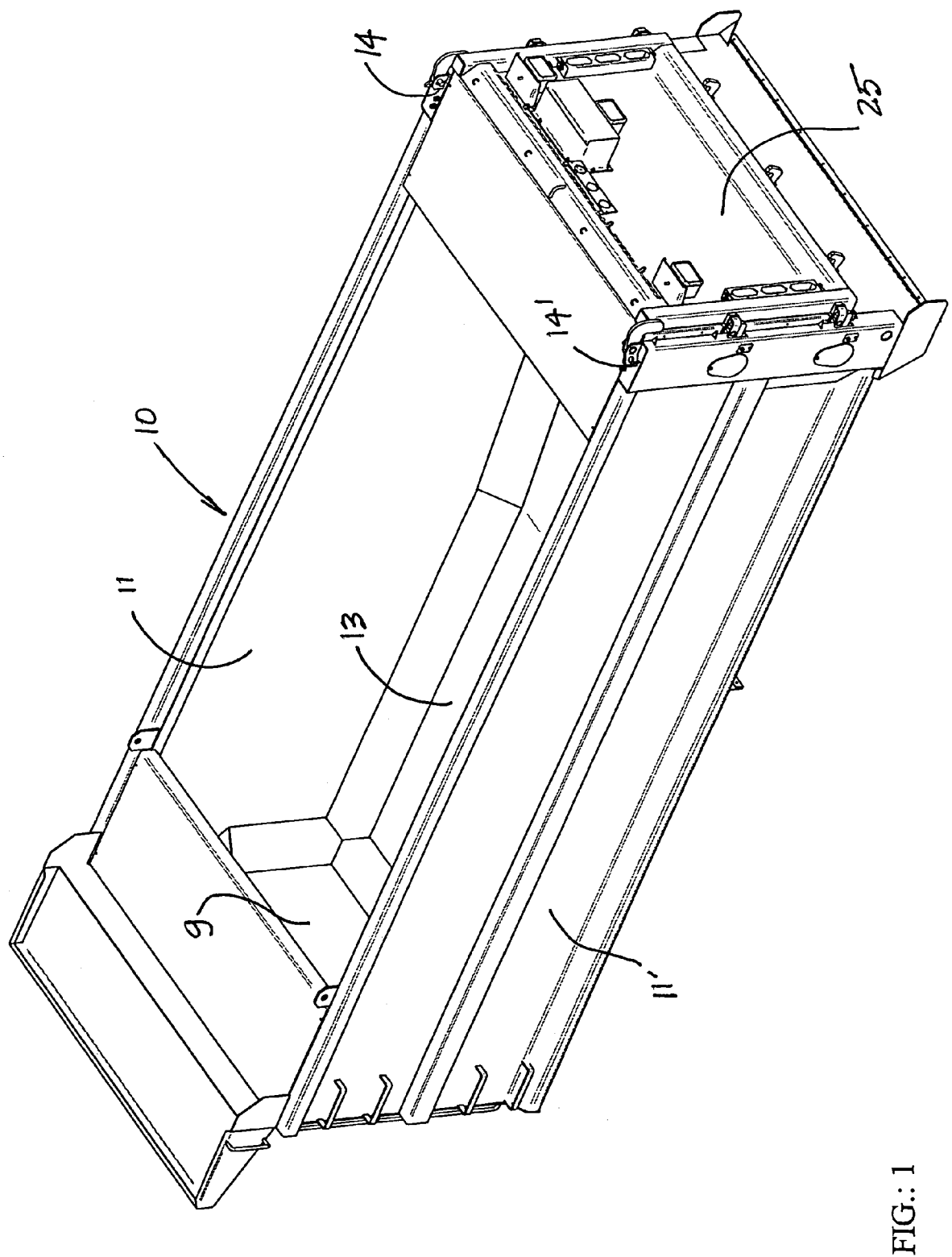
FIG.: 1

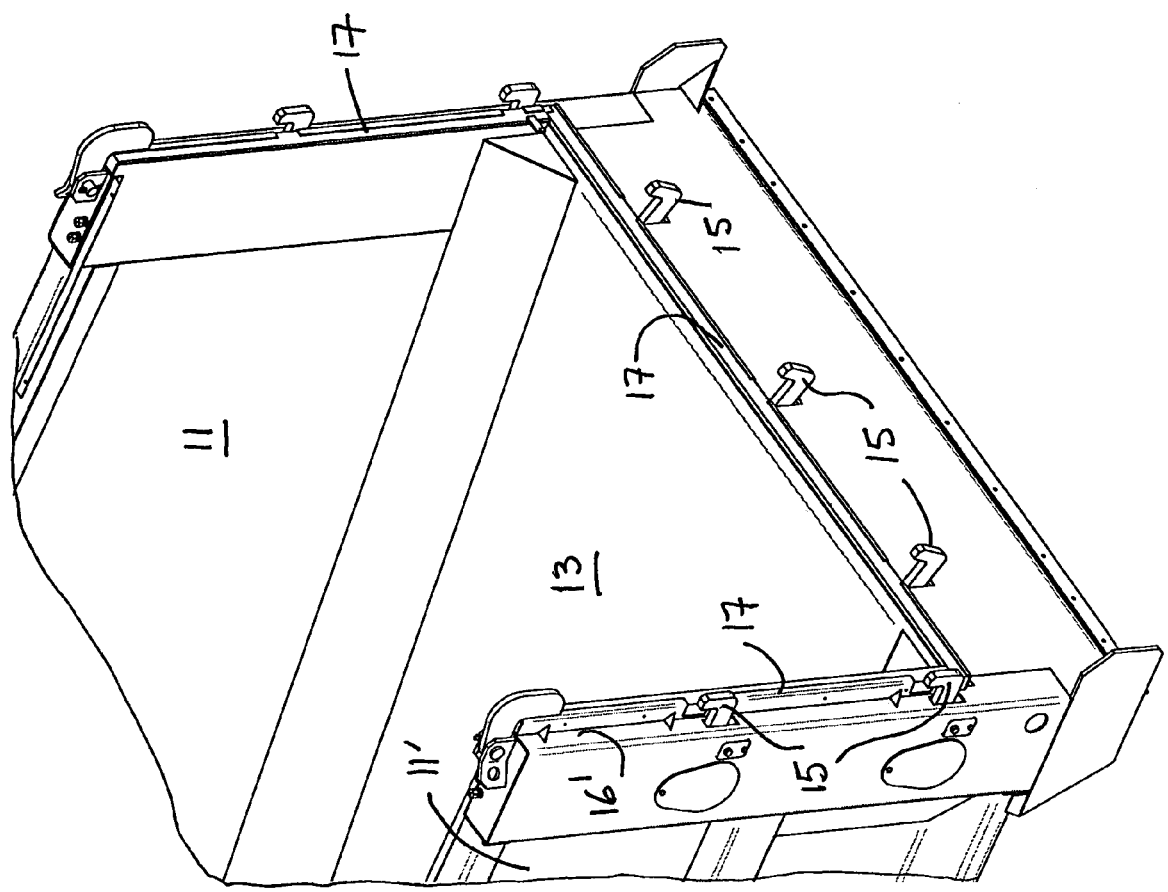
FIG.: 2

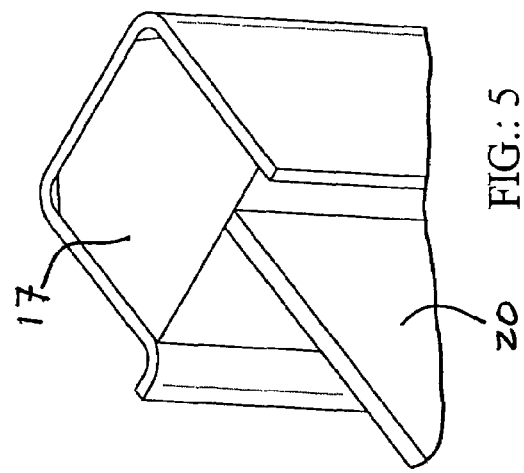
FIG.: 5
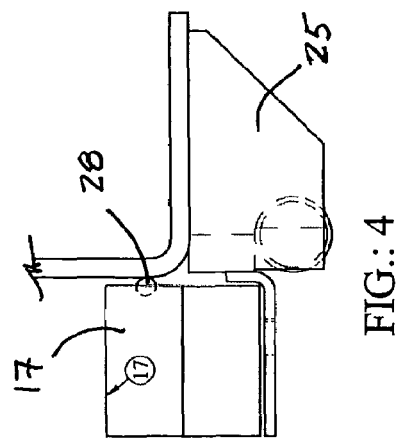
FIG.: 4
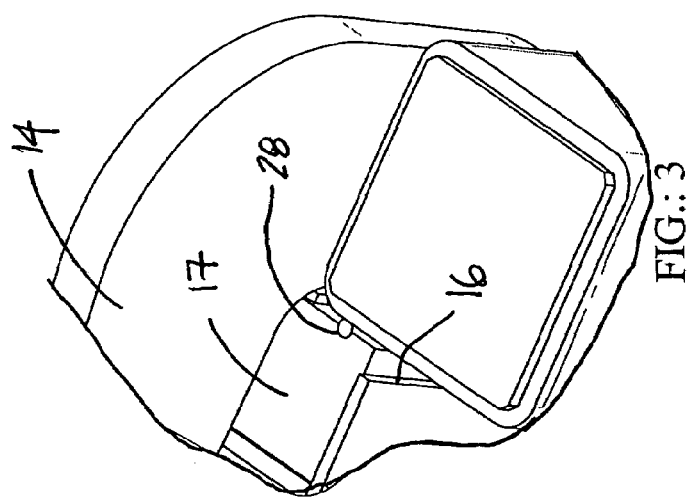
FIG.: 3

SOUND DAMPING AND SEALING SYSTEM FOR TAIL GATE

TECHNICAL FIELD

The present invention relates to a sound damping system for the tail gate of a dump truck.

BACKGROUND ART

When a dump truck releases its load through the tail gate, the tail gate which is usually hinged to the rear top end of the side walls of the box of the truck sways as the box lifts to dump its load. Because some materials stick to the surface of the box due to humidity or the nature of the material, it is common that the driver of the truck will advance the truck and quickly apply the brakes to impart a jerking motion to the box and to cause the heavy steel tail gate to swing and impact against the open rear end of the box to impart vibration to the box whereby to dislodge the stuck material. This is a very noisy procedure as, usually, several attempts are made before dislodging all the stuck material. Often, operators of trucks will routinely cause the rear gate to impact the box when dumping a load without verifying if material is stuck or not to the box. This noise is undesirable. A further problem with the tail gates of the boxes of dump trucks is that they often do not completely seal the box due to the fact that it is in metal-to-metal contact with the box and the fit is not perfect. Also, because the tail gate is subjected to wear-and-tear, often cracks will form between the open rear edges of the box and the tail gate and this is not desirable when transporting fine material, such as sand, and particularly material which is polluting to the environment.

Another disadvantage of impacting the tail gate against the open rear edges of the box of the dump truck is that this subjects the tail gate and its connecting joints to wear-and-tear due to the impact and vibrations. Any weak weld joints or weld spots in the assembly of the tail gate are, therefore, subjected to these shocks and this often causes the welds to break or crack inhibiting corrosion.

SUMMARY OF INVENTION

It is a feature of the present invention to provide a sound damping system which substantially overcomes the above disadvantages of the prior art.

According to another feature of the present invention the system also provides an effective seal between the tail gate and the box of the truck.

According to the above features, from a broad aspect, the present invention provides a sound damping system for a swinging tail gate of a dump truck. The system comprises a two-part seal formed by a compressible sound damping material and a rigid compressing projection. One part of the two-part seal is secured along opposed vertical edges of opposed side walls of an open-top-end box of the truck. The other part is secured on opposed sides of an inner wall of the tail gate and aligned for facial contact with the first part. The tail gate is hingedly secured at a top end thereof to the opposed side walls of the box.

BRIEF DESCRIPTION OF DRAWINGS

A preferred embodiment of the present invention will now be described with reference to the accompanying drawings in which:

FIG. 1 is a perspective view of a dump truck box and the rear gate thereof in an engaged position equipped with the sound damping system of the present invention;

FIG. 2 is an enlarged perspective view, partly fragmented, showing the rear end of the box with the tail gate removed to show the position of the rubber gasket;

FIG. 3 is a further enlarged perspective view, partly fragmented, showing the seal formed between the metal rod secured to the tail gate and the rubber gasket secured to the rear edge of one of the opposed side walls of the box;

FIG. 4 is an enlarged section view showing how the seal is achieved between the metal rod and the gasket; and FIG. 5 is a perspective view, partly fragmented, showing another embodiment wherein the sealing projection is a metal bar which projects into a seal which is encapsulated in a frame which could either be secured to the rear edge of the box or a frame secured in the inner surface of the tail gate.

DESCRIPTION OF PREFERRED EMBODIMENTS

Referring to FIG. 1, there is shown generally at 10 a dump truck box which is an open-top ended box defined by opposed side walls 11 and 11', a front wall 9, and a bottom wall 13. A tail gate 25 is secured at a top rear end of the side walls thereof by pivot assemblies 14 and 14' secured at the rear top edge of the side walls 11 and 11', respectively. This tail gate is provided with a locking system as is well known in the art and as shown in FIG. 2 comprises locking fingers 15 projecting from the rear lower edge 18 of the bottom wall 13 and the rear edges 16 and 16' of the opposed side walls. The tail gate forms the rear wall of the box.

The present invention is concerned with an elongated gasket or seal 17 which is retained captive along the rear edges 16 and 16' of the opposed side walls 11 and 11' and also along the lower rear edge 18 of the bottom wall 13. This seal 17 or gasket is constructed of rigid rubber or other suitable material which is fairly rigid but capable of compressing when a load is applied thereagainst while still transmitting a vibration to the box of the truck but at a much lower frequency resulting in sound damping. In order to seal the rear edges of the box 10, the tail gate is further provided with a seal compressing member in the form of a metal rod 28, as better shown in FIGS. 3 and 4 which is secured and aligned for facial contact with the gasket or seal 17 along the opposed vertical edges and the bottom edge of the rear end of the box 10. When the tail gate 25 is in an engaged position, as shown in FIG. 3, the metal rod 27 compresses the seal 17 whereby to achieve sealing between the rear edge of the box and the tail gate. This is better illustrated in FIG. 4 where it can be seen that the metal rod 28 compresses the sealing material, herein the rubber gasket 17.

For sound damping, the present invention can provide compressible means on the opposed vertical rear edges of the dump truck box and along the vertical end edges of the tail gate. Furthermore, the sealing elements can be inverted whereby the box is provided with the rods or a flat metal bar 20 as shown in FIG. 5 and that the seal 17 be provided within the tail gate inner wall and in facial aligned relationship with the sealing bar. Such an arrangement is illustrated in FIG. 5. Of course, other projection structures are conceivable and obvious to a person skilled in the art. Although not shown in FIG. 5, the flat metal bar 20 is incorporated in the tail gate or the box structure and only projects slightly outside the mating surfaces to define a projecting outer edge to impact and compress the rubber seal 17.

The advantage of this sound damping system is that when the tail gate is swung against the rear edge of the box of the dump truck, the sound is absorbed by the rubber gasket as there is no longer metal-to-metal contact. The gasket also permits these dump trucks to carry fine material or hazardous or polluting materials in a more secure manner. Also, the impact created by metal-to-metal contact, as with the prior art, when the tail gate was swung against the open rear end of the box created shocks or high frequency noise or vibrations particularly within the tail gate and this weakened some of the weld joints and this is a disadvantage that is also remedied by the present invention. The rubber material for this seal or gasket is substantially rigid (hardness of duro 60), whereby to transmit vibration to the box to dislodge material while achieving sound damping.

The invention claimed is:

1. A sound damping system for a swinging tail gate of a dump truck, said system comprising a two-part seal formed by a compressible sound damping material and a rigid compressing projection, one part of said two-part seal being secured along opposed vertical edges of opposed side walls of an open-top-end box of said truck, and the other part secured on opposed sides of an inner wall of said tail gate and aligned for facial contact with said first part, said tail gate being hingedly secured at a top end thereof to said opposed side walls of said box.

2. A sound damping system as claimed in claim 1 wherein said two-part seal is also secured along a rear edge of a bottom wall of said box and along a lower edge of said inner wall of said tail gate.

3. A sound damping system as claimed in claim 2 wherein said rigid compressing projection is a side face of elongated metal rods.

4. A sound damping system as claimed in claim 2 wherein said rigid compressing projection is outer end edges of elongated metal bars.

5. A sound damping system as claimed in claim 2 wherein said one part is said compressible sound damping material and said other part is said rigid compressing projection.

6. A sound damping system as claimed in claim 2 wherein said one part is said rigid compressing projection and said other part is said compressible sound damping material.

7. A sound damping system as claimed in claim 2 wherein said compressible sound damping material is a rigid compressible rubber seal.

8. A sound damping system as claimed in claim 5 wherein said sound damping material is a rubber strip having a hardness of duro 60.

9. A sound damping system as claimed in claim 1 wherein said compressible sound damping material also provides a seal between said tail gate and said side walls and bottom wall of said box.

* * * * *